(12) United States Patent
Nishikata

(10) Patent No.: US 6,890,074 B2
(45) Date of Patent: May 10, 2005

(54) SPECTACLES WITH LENSES

(75) Inventor: Masato Nishikata, Fukui-ken (JP)

(73) Assignee: Combex, Ltd., Fukui-ken (JP)

( * ) Notice: Subject to any disclaimer, the term of this patent is extended or adjusted under 35 U.S.C. 154(b) by 0 days.

(21) Appl. No.: 10/419,714

(22) Filed: Apr. 21, 2003

(65) Prior Publication Data
US 2004/0165144 A1 Aug. 26, 2004

(30) Foreign Application Priority Data
Feb. 26, 2003 (JP) ........................................ 2003-049469

(51) Int. Cl.[7] .............................................. G02C 7/02
(52) U.S. Cl. ........................................ 351/159; 351/41
(58) Field of Search .................................. 351/159, 166, 351/177–178, 41, 44–46, 49; 2/410, 5, 6.1–6.5, 6.7, 425, 15, 426–427, 431–432, 435–436

(56) References Cited

U.S. PATENT DOCUMENTS

| 5,900,921 | A | * | 5/1999 | Min ............................. 351/44 |
| 2002/0118337 | A1 | * | 8/2002 | Perrott et al. ................ 351/159 |
| 2002/0136897 | A1 | * | 9/2002 | Okamoto et al. ......... 428/411.1 |
| 2002/0196408 | A1 | * | 12/2002 | Bhalakia et al. ............. 351/159 |

FOREIGN PATENT DOCUMENTS

WO          WO 92/05464      *    4/1992

* cited by examiner

Primary Examiner—Jordan M. Schwartz
(74) Attorney, Agent, or Firm—Flynn, Thiel, Boutell & Tanis, P.C.

(57) ABSTRACT

An object of this invention is to improve the safety. Lens bodies 2, 2a are formed integrally on the rear surface of a shield so as to avoid such a danger that the eyes may be injured due to drop or separation of the lens bodies 2, 2a.

3 Claims, 3 Drawing Sheets

SPECTACLES WITH LENSES

BACKGROUND OF THE INVENTION

1. Field of the Invention

The present invention relates to a pair of shield type spectacles with lenses which cover both eyes with a piece of shield and manufacturing method thereof.

2. Description of Related Art

Conventionally, a pair of the shield type spectacles which cover both eyes with a piece of the shield made of synthetic resin has been used mainly for occasions of playing sports because it is lightweight, strong and fashionable.

Further, various kinds of shield type spectacles with lenses for adjusting eyesight provided at specified positions have been provided.

Any documents which should be mentioned are not known to this inventor because any survey on related art has not been achieved at a research and development stage or a patent application stage.

However, in conventional spectacles with lenses, its shield and lenses are separated components, and lens bodies formed separately are engaged in through holes made at specified positions of the shield or bonded on the rear face of the shield. Thus, there is such a fear that the lens bodies may drop when a strong impact is received, and therefore this pair of the spectacles with lenses has a problem in views of the safety.

SUMMARY OF THE INVENTION

The present invention intends to solve the problem of improving the safety of the conventional art by forming the lens bodies integrally on the rear face of the shield so as to eliminate a risk that the eyes may be damaged by drop or separation of the lens bodies.

DESCRIPTION OF PREFERRED EMBODIMENTS

Hereinafter, the embodiment of the present invention will be described with reference to accompanying drawings.

Figure 1A:
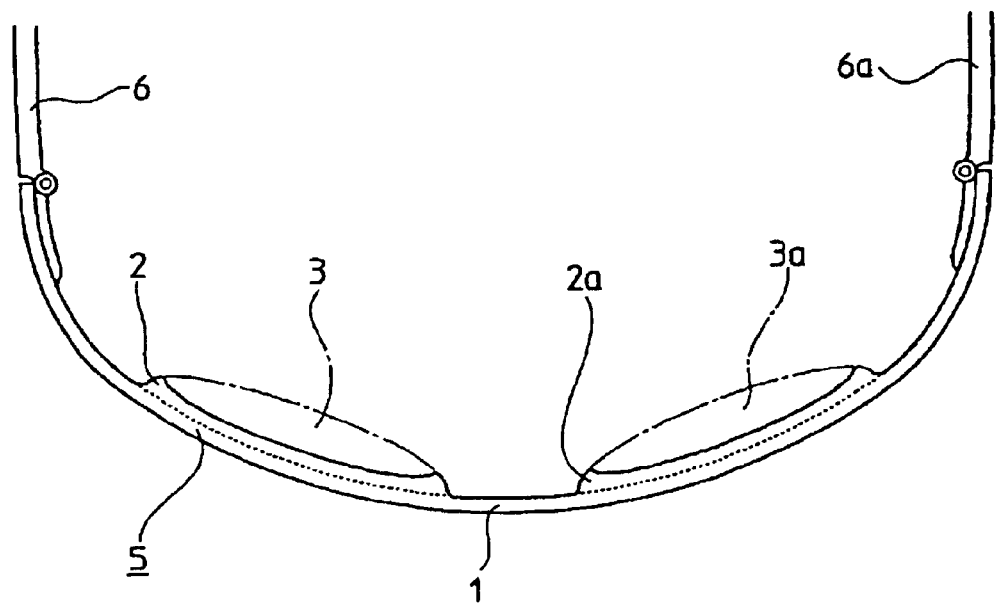
FIGS. 1(*a*) and 1(*b*) are sectional views obtained when the spectacles with lenses of the present invention are cut horizontally.
Figure 1B:
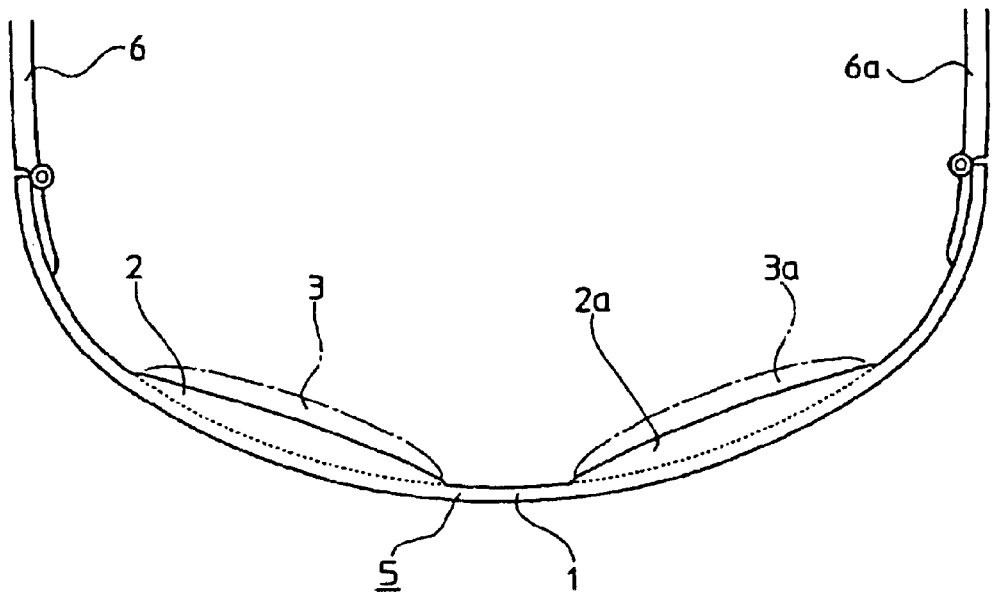
Figure 2:
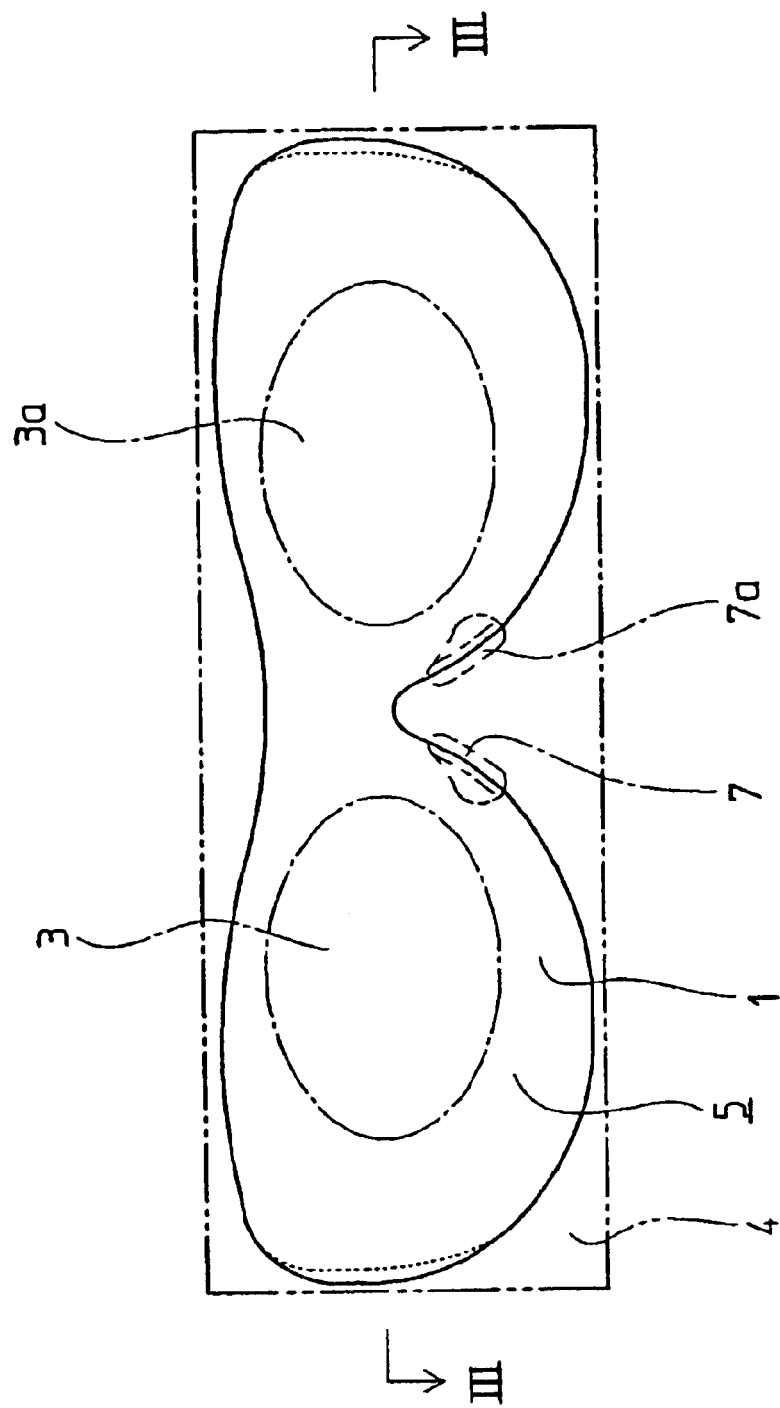
FIG. 2 is a front view of a shield with lenses, which is used in the spectacles with lenses of FIG. 1.
Figure 3:
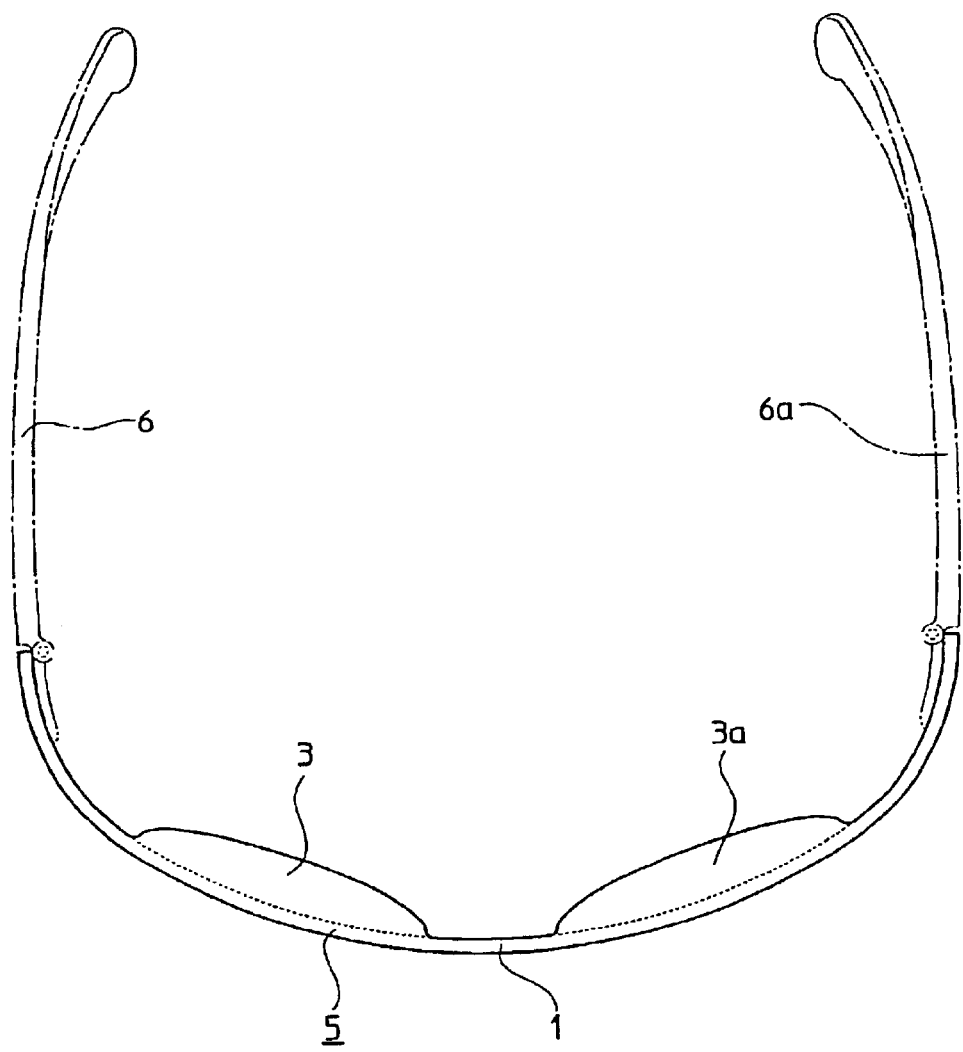
FIG. 3 is a sectional view taken along the line III—III of FIG. 2.

The spectacles with lenses of the present invention are composed of synthetic resin having excellent light transmission property and impact resistance such as polycarbonate resin and ABS resin and, as shown in FIGS. 1–3, a shield 1 for covering both eyes and lens bodies 2, 2*a* for adjusting the eyesight are formed integrally with each other.

The shield 1 is formed such that its surface is of a convex curved shape and the lens bodies 2, 2*a* are positioned at two positions on the right and left of the rear face of the shield 1, that is, at specified positions corresponding to both eyes of a person wearing the spectacles. The surface of each of the lens bodies 2, 2*a* is formed in a concave shape or a convex shape as shown in FIGS. 1(*a*) and 1(*b*).

Next, the manufacturing process for the spectacles with lenses of the present invention will be described in detail.

First, a shield base 4 whose surface is convex and has two convex portions 3, 3*a* on its rear face, is formed according to a pouring mold polymerization method using monomer such as polycarbonate resin or an injection molding method using thermoplastic resin and then, the shield 1 having a desired shape is cut out from the shield base 4 by cutting off unnecessary portions on an outer periphery of the shield base 4 (see FIGS. 2, 3).

Next, the surfaces of the convex portions 3, 3*a* on the rear faces of the shield 1 are ground into a concave shape or convex shape so as to adjust its curvature to a predetermined one and then, a shield with lenses 5 in which lens bodies 2, 2*a* are formed, is obtained (see FIG. 1).

Finally, temples 6, 6*a* are attached near right and left ends of the shield with lenses 5 and further, nose pieces 7, 7*a* are attached to the bottom in the center of the shield with lenses 5, so that finally, the shield type spectacles with lenses are formed.

If the spectacles with lenses are formed in the form of sunglasses, for example, pigment is mixed and dispersed appropriately in synthetic resin for formation of the shield base 4, or a transparent shield 5 whose lens bodies 2, 2*a* are adjusted in terms of their surface curvature is dipped into dye to which dyeing aid is added to raise transparency, so as to dye the spectacles.

If it is intended to make polarizing spectacles with lenses, for example, a concave groove is provided peripherally in the middle portion of an inner face of a cylinder longitudinally separable in a forming process of the shield base 4, then a polarizing film is engaged in that concave groove and resin monomer is poured on and under the polarizing film. As a result, the shield base 4 in which the polarizing film is sandwiched between the front and rear surface shields, and the shield with lenses 5 is cut out from the shield base 4.

Although according to this embodiment, the spectacles with lenses, to which the temples 6, 6*a* and the nose pieces 7, 7*a*, separate from the shield with lenses 5 are attached, has been described, the temples 6, 6*a* and the nose pieces 7, 7*a* may be formed integrally when the shield base 4 is formed.

Because, according to the present invention, the lens bodies 2, 2*a* are formed integrally on the rear face of the shield 1, the lens bodies 2, 2*a* never drop or are never separated. Thus, the eyes are protected from a damage due to a disengagement of the lens bodies 2, 2*a*, thereby improving the safety of the spectacles.

Further, because the quantity of necessary parts is reduced, the manufacturing process is simplified, thereby reducing manufacturing cost and shortening the time for products delivery. Further, because the kind of stocks can be single, management cost can be lowered.

Concerning, the conventional product in which the lens bodies are engaged or bonded to the shield, if the lens bodies are provided on the side of a front surface of the shield in order to prevent a dropped or separated lens body from coming toward eyeballs, a gap is generated on a boundary between the shield and the lens body, so that dust and dirt are deposited in this gap, thereby the spectacles being likely to be contaminated. However, because the present invention has no gap on the surface of the shield 1, it is unlikely to be contaminated and even if stain is attached, it can be wiped out easily.

Because the shield 1 is formed such that its surface is of a convex curved shape, not only a wide field of vision can be secured, but also feeling of fitting to the shape of a wearer's head can be improved.

Because the surface of each of the lens bodies 2, 2*a* is formed in a concave shape, the lens bodies 2, 2*a* can be adjusted to a desired degree of lens both for shortsightedness and for farsightedness.

Because the surface of each of the lens bodies 2, 2a is formed in a convex shape, the lens bodies 2, 2a are adjusted to high refraction type, thereby making the lens bodies 2, 2a thin. Consequently, even if a high degree of lens is required, a sufficient clearance can be secured between the lens bodies 2, 2a and the eyes.

Because the shield 1 and the lens bodies 2, 2a are formed of synthetic resin having light transmission property such as polycarbonate resin and ABS resin, the spectacles can be formed in a lightweight and strong structure, so that they can meet demands in the sport field which entails strenuous activities.

Because the shield 1 is formed such that the polarizing film is sandwiched between the shields on the front and rear surfaces, its dazzlment protection performance is raised thereby expanding a further applicability.

If the spectacles are formed of a material in which pigment is mixed and dispersed, a thick portion becomes dense while a thin portion becomes pale so that entirely unevenness in coloring may occur. However, because the shield 1 and the lens bodies 2, 2a are dyed, it is possible to obtain a sunglass uniformly dyed by allowing dye to penetrate into only a surface portion of each of the shield 1 and lens bodies 2, 2a. Therefore, a practical effect of the present invention is very enormous.

What is claimed is:

1. Spectacles comprising:

a single shield having a curved shape for covering both eyes of a wearer, said single shield having a light transmission property, said single shield having a front object side face and a rear eye side face;

spaced right and left eye lens bodies projecting outwardly from the rear eye side face of said single shield, said spaced right and left eye lens bodies having a light transmission property, said right and left eye lens bodies being integrally formed with said single shield so that said eye lens bodies are not separable from said single shield;

temples secured at opposing ends of said shield for supporting said spectacles on a wearer; and nose tabs for supporting the glasses on a wearer, wherein each said lens body has a rear eye side lens face having one of a convex shape and a concave shape.

2. The spectacles of claim 1, wherein said single shield comprises an eye side shield portion and an object side shield portion, said spectacles further comprising a polarizing film fixed between said eye side shield portion and said object side shield portion, wherein said eye side shield portion and said object side shield portion forming said single shield are integrally formed, and wherein said single shield and said right and left eye lens bodies comprise a synthetic resin.

3. The spectacles of claim 2, wherein said temples and said nose tabs are integrally formed with said single shield, and wherein said single shield and said lens bodies are dyed.

* * * * *